US008350894B2

(12) United States Patent
Turner et al.

(10) Patent No.: US 8,350,894 B2
(45) Date of Patent: Jan. 8, 2013

(54) SYSTEM AND METHOD FOR STEREOSCOPIC IMAGING

(75) Inventors: Robert W. Turner, Federal Way, WA (US); David W. Hoffman, Kent, WA (US)

(73) Assignee: The Boeing Company, Chicago, IL (US)

( * ) Notice: Subject to any disclaimer, the term of this patent is extended or adjusted under 35 U.S.C. 154(b) by 724 days.

(21) Appl. No.: 12/425,613

(22) Filed: Apr. 17, 2009

(65) Prior Publication Data

US 2010/0295927 A1 Nov. 25, 2010

(51) Int. Cl.
*H04N 13/00* (2006.01)
*H04N 13/02* (2006.01)

(52) U.S. Cl. .......... 348/50; 348/135; 348/591; 348/159; 348/144; 348/113; 348/161; 348/184; 348/185; 382/173; 382/190; 382/219; 382/294; 382/103; 382/107; 382/167; 382/181

(58) Field of Classification Search ................ 348/50, 348/149, 143
See application file for complete search history.

(56) References Cited

U.S. PATENT DOCUMENTS

| | | | | |
|---|---|---|---|---|
| 5,757,522 | A * | 5/1998 | Kulick et al. | 359/9 |
| 6,862,364 | B1 * | 3/2005 | Berestov | 382/132 |
| 7,956,899 | B2 * | 6/2011 | Kurokawa | 348/208.6 |
| 2007/0263096 | A1 * | 11/2007 | Bouzar | 348/208.3 |
| 2009/0059017 | A1 * | 3/2009 | Kurokawa | 348/208.1 |
| 2009/0109276 | A1 * | 4/2009 | Kim | 348/14.02 |
| 2010/0259610 | A1 * | 10/2010 | Petersen | 348/142 |

OTHER PUBLICATIONS

Rasband, Wayne. "ImageJ", National Institutes of Health, USA, at least one day prior to Apr. 17, 2009, http://rsb.info.nih.gov/ij/, 5 Pages.
Thévanaz, Philippe. "TurboReg", Biomedical Imaging Group, Swiss Federal Institute of Technology Lausanne, at least one day prior to Apr. 17, 2009, 13 Pages.
Petie, Ronald. "Two Shot Anaglyph", Jun. 3, 2005, http://rsbweb.nih.gov/ij/plugins/anaglyph.html, 2 Pages.
Rodin, V. and Ayache, A. "Axial Stereovision: Modelization and Comparison Between Two Calibration Methods", Image processing, 1994. Proceeding ICIP-94, IEEE International Conference, vol. 2, Nov. 13-16, 1994, pp. 725-729.
Alvertos, Nicolas. "Resolution Limitations and Error Analysis for Stereo Camera Models", Southeastcon '88, IEEE Conference Proceedings, Apr. 11-13, 1988, pp. 220-224.

* cited by examiner

*Primary Examiner* — Jude Jean Gilles
(74) *Attorney, Agent, or Firm* — Harness, Dickey & Pierce, P.L.C.

(57) ABSTRACT

A method is disclosed for performing stereoscopic imaging. The method may involve obtaining a first image of a scene, at a first time, using a camera disposed on a platform, where the distance between the camera and the scene is changing. The camera may be used to obtain a second image of the scene, at a second time, with one of the first and second images being larger than the other. One of the images that is larger than the other may be resized so that the sizes of the two images are substantially similar. Both of the images may be rotated a predetermined degree so that the images form a stereo pair that may be viewed with a stereoscope viewing component or made into an anaglyph for viewing with an anaglyph viewing component.

20 Claims, 5 Drawing Sheets

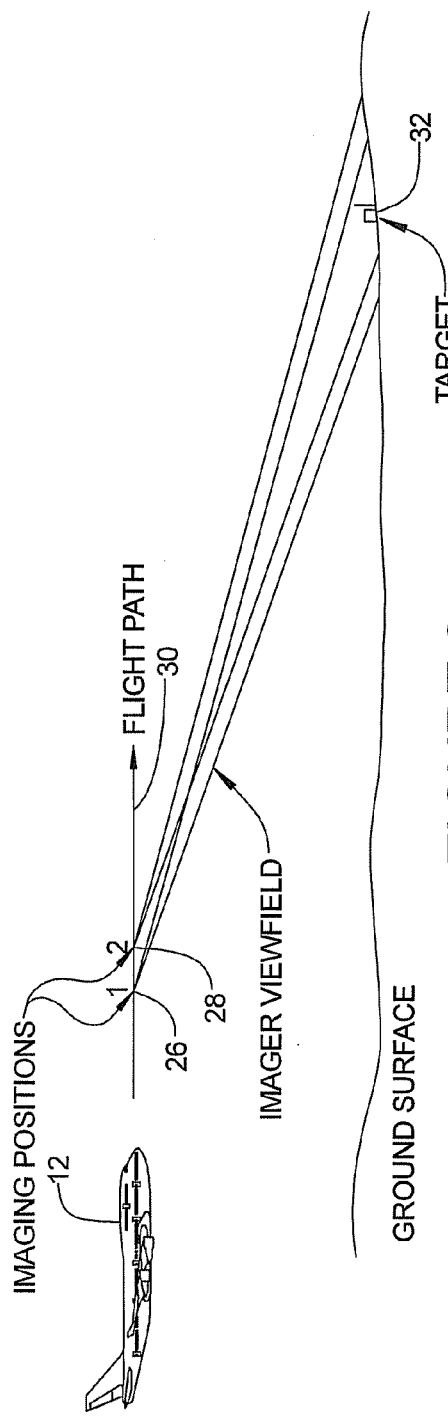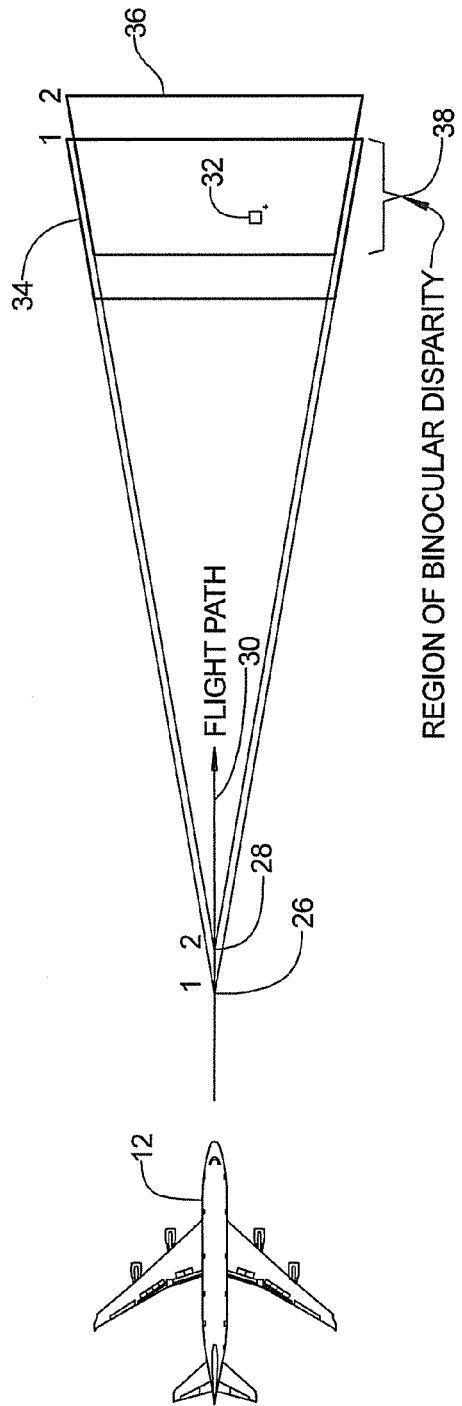

a. BEFORE b. AFTER

FIGURE 5
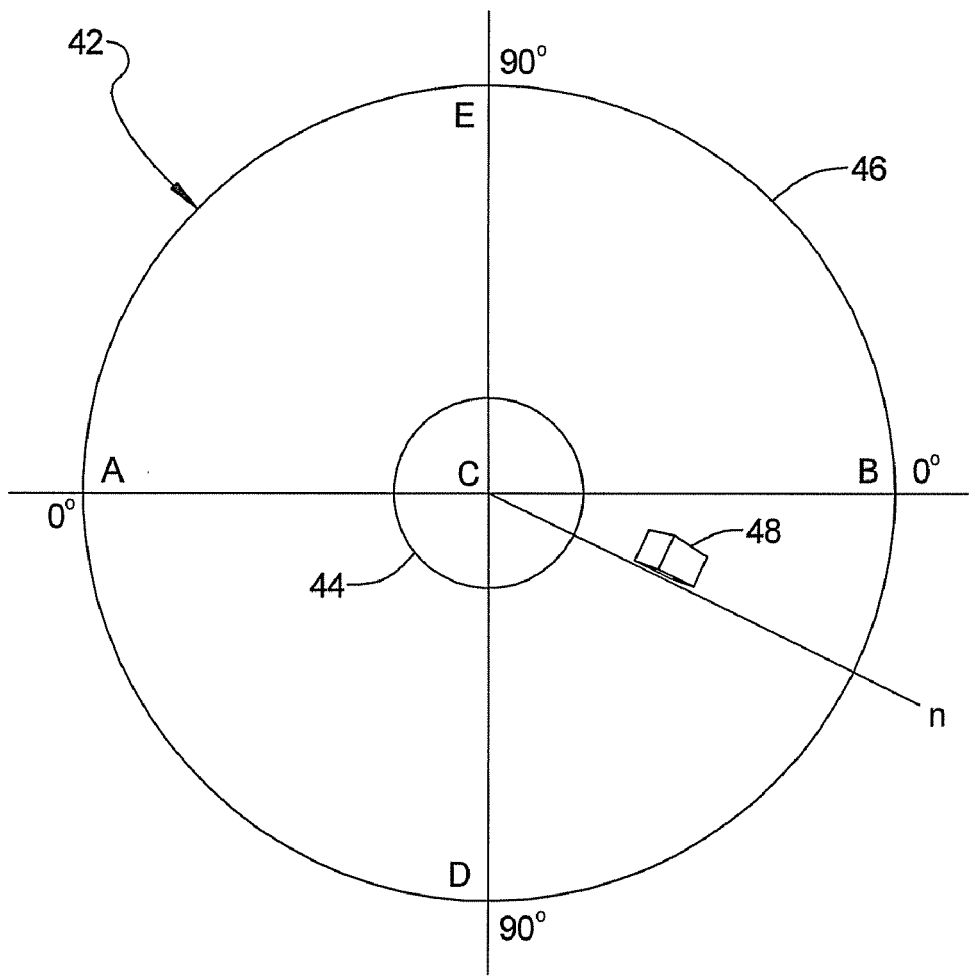
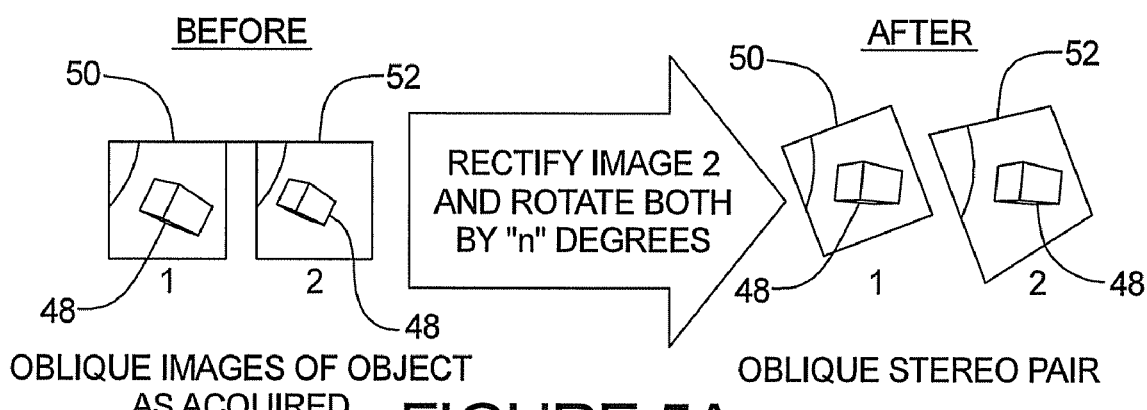
FIGURE 5A

SYSTEM AND METHOD FOR STEREOSCOPIC IMAGING

CROSS-REFERENCE TO RELATED APPLICATIONS

The present application is related in general subject matter to U.S. patent application Ser. No. 11/382,523, filed May 10, 2006, entitled "System and Architecture for Automatic Image Registration," assigned to The Boeing Company, and hereby incorporated by reference in its entirety into the present application (now abandoned). The present application is further related in general subject matter to pending commonly assigned U.S. patent application Ser. No. 11/554,722, filed Oct. 31, 2006, entitled "Method and System for Image Registration Quality Confirmation and Improvement," hereby incorporated by reference in its entirety into the present application.

FIELD

The present disclosure relates to systems and methods for imaging scenes or objects, and more particularly to stereoscopic imaging systems and methods.

BACKGROUND

The statements in this section merely provide background information related to the present disclosure and may not constitute prior art.

Photographic stereoscopy is a well known technique used by military and civilian air photo analysts while studying ground scenes to obtain intelligence information. The photos are ordinarily taken by a reconnaissance camera carried on an aircraft and aimed at or near perpendicular to the flight path of the aircraft. Only one camera is needed, and it is aimed vertically downward in mapping applications or obliquely (i.e., 90 degrees relative to the direction of travel of the aircraft) toward the horizon for standoff. The camera takes pictures at time intervals, producing a series of images. View fields of adjacent images overlap to produce the stereo effect. During photo interpretation, two different images showing the same scene are arranged side-by-side for stereoscopic viewing. They can also be specially processed to form an anaglyph.

Laser Detection and Ranging (LADAR) and Light Detection and Ranging (LIDAR) are methods of obtaining an image in which each pixel is accompanied by a range measurement. With LADAR, an active light source is required, and range information is obtained for each pixel by measuring the transit time of the illumination pulse. Each image pixel has measurements that locate it in three dimensional space. A LADAR image can be viewed as a normal photograph such that points in the scene are color-coded based on distance from the camera. The LADAR image can also be rotated by computer graphics functions for viewing from different angles. Rotation results in gaps in the image. The gaps represent scene volumes obscured by foreground surfaces as viewed by the sensor at the acquisition location.

Imaging LADAR has three variants. The first, "Scanning LADAR," may use a laser to paint the scene like the electron gun in a vacuum tube television. The second, "Flash LADAR," makes use of a wide beam laser that illuminates the entire scene at once, and each pixel calculates its own light transmission time. The third, "Streak-tube LADAR," uses a fan shaped laser beam to illuminate either a row or a column of scene pixels at one time, and scans across the scene using sequential bursts of illumination. Imaging Synthetic Aperture Radar (SAR) and imaging SONAR are also similar to LADAR in their methods and products.

One limitation of the existing photographic stereoscopy process is that the views are limited to being oriented at angles near perpendicular to the flight path of the airborne mobile platform (e.g., aircraft) from which the images are being taken. A second limitation is that the existing stereoscopic solution requires the scenes in the two photos to be at or near the same size.

Another limitation of the existing LADAR solution is its current state of development, which complicates evaluation of its effectiveness. Still another limitation is the absence of non-topographic surface texture in the target's image. Yet another limitation is that LADAR is not presently in common use.

SUMMARY

In one aspect the present disclosure relates to a method for performing stereoscopic imaging. The method may comprise: obtaining a first image of a scene, at a first time, using a camera disposed on a platform, where the distance between the camera and the scene is changing; using the camera to obtain a second image of the scene, at a second time, one of the first and second images being larger than the other; resizing one of the images so that the sizes of the two images are substantially similar; and rotating both of the images a predetermined degree so that the images form a stereo pair that may be either viewed with a stereo pair viewing component or made into an anaglyph for viewing with an anaglyph viewing component.

In another aspect the present disclosure relates to a method for performing stereoscopic imaging. The method may comprise: obtaining a first image of a scene, at a first time, using a camera disposed on a mobile platform and aimed in a direction generally parallel to the direction of travel of the mobile platform, and where the distance between the camera and the scene is changing; using the camera to obtain a second image of the scene, at a second time, one of the first and second images being larger than the other; resizing one of the images so that the sizes of the two images are substantially similar; and rotating both of the images a predetermined degree so that the images form a stereo pair that may be either viewed with a stereo pair viewing component or made into an anaglyph for viewing with an anaglyph viewing component.

In another aspect the present disclosure relates to a system for producing a stereoscopic image. The system may comprise: a camera mounted on a platform for obtaining first and second images of a scene at two different points in time, the images further being obtained while a distance between the platform and the scene is changing such that one of the images is larger than the other; a processor adapted to analyze the images and to resize one of the images such that both of the images are approximately the same size, and to rotate both of the images in a common rotational direction by a predetermined degree, to create a stereo pair that may be either viewed with a stereo pair viewing component or made into an anaglyph for viewing with an anaglyph viewing component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a side view illustrating the two points along a longitudinal axis of a mobile platform where a camera may be used to obtain two successive images of a scene, in this example a scene having a target included in it;

FIG. 3 is the top view of the illustration of FIG. 2 that illustrates the region of binocular disparity that may be exploited to form a stereo pair or an anaglyph using the two successively acquired images;

FIG. 5 further illustrates a diagram that helps to explain how the stereo axial image pair of FIGS. 4A and 4B is obtained;

FIG. 5A illustrates the rectifying and translating of the two acquired images.

DETAILED DESCRIPTION

Figure 1:
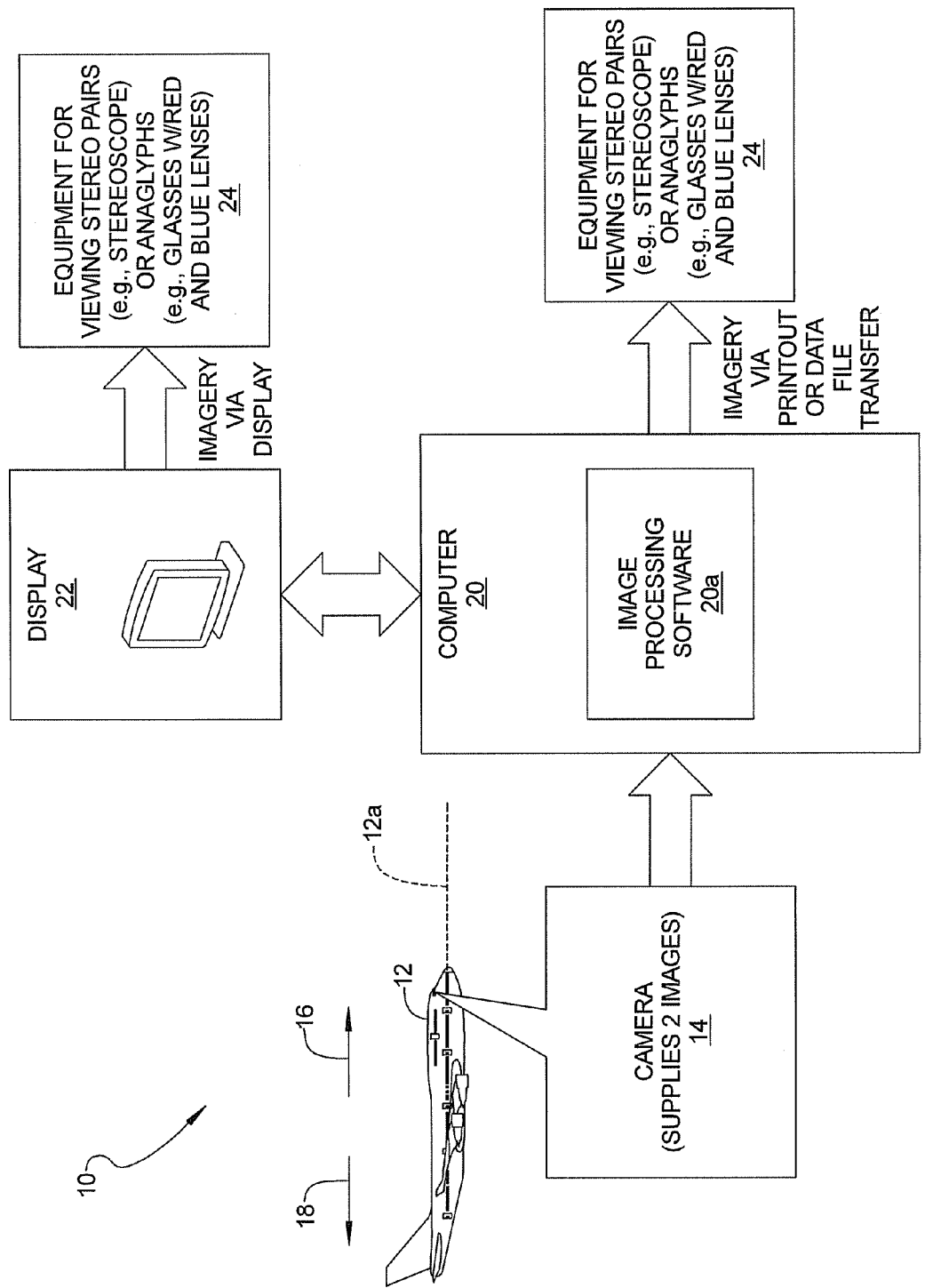
FIG. 1 is a block diagram of one embodiment of a system in accordance with the present disclosure for producing a stereoscopic image.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a system 10 for producing a stereoscopic image using a near-axially-obtained image pair. In one embodiment a mobile platform 12 is used to carry a digital camera 14. As will be explained in greater detail in the following paragraphs, the camera 14 acquires two successive digital images of a scene at two different points in space. The camera 14 may be positioned generally parallel to a longitudinal axis 12a of the mobile platform 12, for example axially in line with a gun (not shown) mounted on the mobile platform 12, or it may be positioned at a location offset from the longitudinal axis 12a, such as on a wing. In either event, the camera 14 may be aimed either along the longitudinal axis 12a or along a path generally parallel to, but laterally offset from, the longitudinal axis 12a. The camera 14 may be aimed forwardly relative to a direction of travel of the mobile platform 12, such as in the direction of arrow 16, or it may be aimed rearwardly relative to the direction of travel of the mobile platform 12, such as indicated by arrow 18.

While this example shows the mobile platform 12 as an aircraft in flight, it will be appreciated that the camera 14 could just as readily be mounted stationary on any type of support platform, and used to obtain two successive images of an object or of two scenes that are moving toward the camera 14. Thus, the system 10 is useable in virtually any application where there is expected to be relative movement between the camera 14 and the scene, whether it is the camera moving toward a stationary scene, or a moving scene (such as one or more objects) moving toward a stationary camera.

Also, while the following description will make reference to the mobile platform 12 as being "aircraft 12", it will be appreciated that the system 10 may be implemented with virtually any other type of mobile platform. Other possible forms of mobile platforms may include, without limitation, marine (surface and underwater) vessels, land vehicles such as cars, trucks, buses and trains, or any other form of airborne platform (manned or unmanned) such as a rotorcraft or even a spacecraft, or possibly on land based robotic vehicles.

Referring further to FIG. 1, the system 10 may include computer 20, such as a desktop, laptop or virtually any other suitable computing device, for receiving the digital images from the camera 14. The computer 20 may make use of commercially available digital image editing software for processing the two digital images. One suitable digital image editing software product may be the public domain program "ImageJ" using public domain plug-ins "TurboReg" and "Two Shot Anaglyph." The processing may involve, as will be described in even greater detail in the following paragraphs, resizing one of the two digital images (usually the larger one of the two) so that the two images are approximately the same size, and rotating the two images up to 90 degrees to produce a stereo pair that has a degree of binocular disparity between the two images. To aid a user in working with the computer 20 to carry out the digital image processing a display 22 may be placed in communication with the computer 20 if the computer does not incorporate such a display. A suitable viewing implement 24, may be used with the display to view the imagery. The viewing implement 24 may be a display-mounted stereoscope for viewing stereo pairs or glasses having one red lens and one blue lens for viewing the anaglyph created from the stereo pair. The binocular disparity provides the image pair with a three dimensional quality when viewed through the viewing implement. Other forms of viewing implements may include electronic binocular displays that users wear like glasses. Also, a skill common among experienced photo analysts is the ability to view stereo pairs with the unaided eyes, without using special equipment.

Referring to FIG. 2, an illustration is provided that shows the aircraft 12 acquiring the two digital images. For simplicity, in this Figure the camera 14 has been omitted. In this example the two images are captured at points 26 and 28 essentially along the flight path of the aircraft 12, as indicated by line 30. In this example a target 32 forms the object that is being captured in the two images. However, it will be appreciated that the two images could also simply be capturing pictures (i.e., scenes) of the topography of the Earth, with no specific object being present in the scenes representing the two images.

FIG. 3 illustrates the above-described acquisition of the two images in a plan view. From FIG. 3 it can be seen that an image 34 is obtained that corresponds to image point 26 in FIG. 2, while an image 36 is obtained that corresponds to the image point 28 in FIG. 2. Thus, the two images overlap slightly. Bracket 38 represents the region of binocular disparity where the slight differences between the two images are exploited by the human visual system to provide the three dimensional quality to the image pair 34,36 after the image pair is processed to form a stereo pair and then viewed through a stereoscope. Binocular disparity exists only in the overlapping region of the image pair where scene objects appear in both images. Overlap can be demarcated by plotting the border of one image of the image pair onto the other image.

Figure 4A:
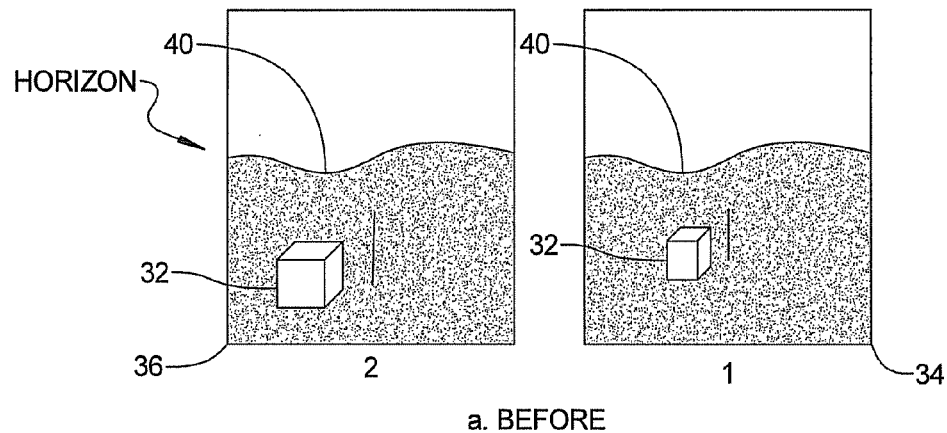
FIG. 4A illustrates the two images obtained, and before rectification, showing that one image is larger than the other.

FIG. 4A illustrates the images 34 and 36 showing how they may appear before image editing is performed. The first obtained image 34 shows the object 32 clearly smaller in size than the second image 36. In this example this is because the aircraft 12 is travelling toward the scene from which the two images 34,36 are taken, and thus the aircraft 12 is closer to the object 32 when the second image 36 is taken. The horizon 40 in this example is positioned generally horizontally in the two images 34,36. If the camera 14 is mounted to face rearwardly relative to the direction of travel, as indicated by line 18 in FIG. 1, then the object 32 in the first image 34 would be larger and may be the one that is resized to make it smaller. Alternatively, the one of the two images 34,36 where the target 32 appears smaller could be rectified (i.e., re-sized) to make it larger. In either event the object 32 as seen in both images 34,36 is made so that it appears to be approximately the same dimensions in both images 34,36. It will be appreciated that to achieve at least some small degree of binocular disparity, in order to provide the 3D effect when the two images 34,36 are viewed with a suitable viewing implement, that the two images should be at least slightly offset from the axis along which the camera 14 is aimed. In this example that camera axis would be 12a in FIG. 1. This ensures that as the two images are captured, because of the relative movement between the platform and the scene being imaged, that the parts of the two images 34,36 showing object 32 are located laterally of the axis 12a.

Figure 4B:
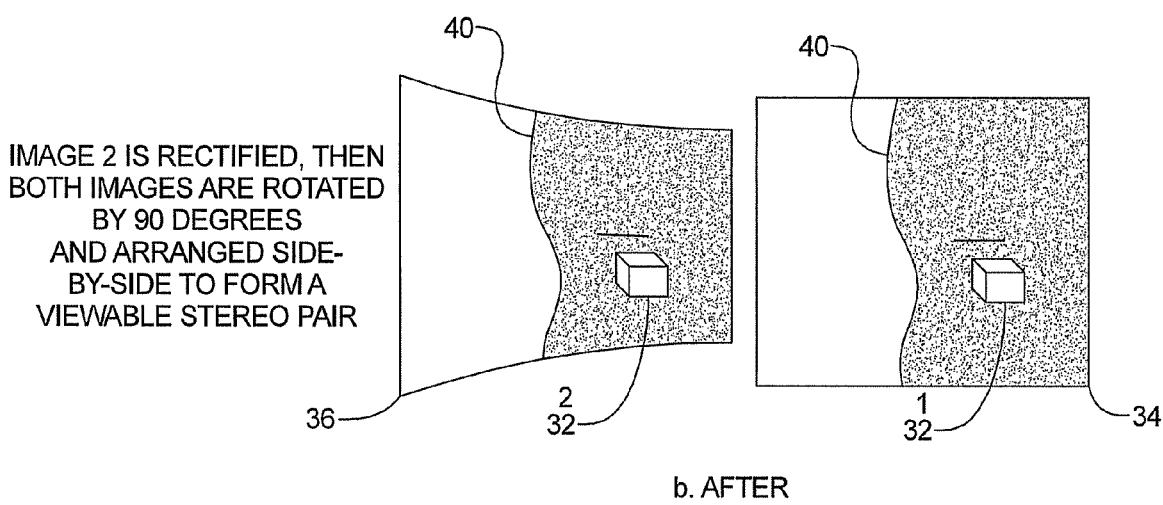
FIG. 4B illustrates the larger one of the images in FIG. 4A having been rectified, and both images rotated 90 degrees to form a stereo pair that may then form a stereoscopic image when the two images are viewed with a suitable viewing implement.

In FIG. 4B the second image 36 has been "rectified," meaning resized, so that the target 32 is approximately equal in overall dimensions to how the object 32 appears in the first image 34. This resizing may be performed by the computer 20 using the digital image editing software 20a. When the images 34 and 36 are to be viewed by a human using a stereoscope, they are both rotated by a predetermined degree, in this example 90 degrees in the counterclockwise direction. As such their horizons 40 now appear vertical. It will be appreciated that the separation distance between the images depends on the viewing mechanism. Stereoscopes with folded optics can accommodate a range of distances from inches to several feet. Rotating the images 34,36 makes their binocular disparity available to the human visual system, enabling the human to perceive depth in the overlapping region 38 of the image pair. The images are then arranged side-by-side such that the distance between the appearances of object 32 on the two images is consistent with separation between the stereoscope's two optical axes. The images now form a stereo pair ready for the human to view through the stereoscope.

Referring to FIG. 5, the principles underlying operation of the system 10 and its methodology can be further understood by imagining looking into a pipe 42 that has objects fastened to its inside wall. In FIG. 5 the inner circle 44 represents the far end of the pipe 42. The outer circle 46 represents the near end of the pipe 42. Object 48 is fastened to the pipe's 42 inside wall. Point C is at the center of the pipe 42 and is the end view of the pipe's 42 centerline. Line ACB represents the edge-on view of the plane containing the human viewer's eyes and the pipe's 42 centerline. For this disclosure, Plane ACB is defined as the "eye plane." In oblique aerial photography, the eye plane is parallel to the horizon and the Earth's surface beneath the aircraft 12. Line DCE represents the edge-on view of the plane perpendicular to the eye plane—it intersects the eye plane along the pipe's 42 centerline. Object 48 is located close to the angle of "n" degrees from the eye plane. Two images 50 and 52 of object 48 captured from two separate positions on the pipe's 42 centerline are shown in FIG. 5A under "Before." Image 50 is captured closer to object 48 than Image 52. Image 52 shows the object 48 slightly smaller and at a slightly different viewing angle than Image 50. To create a stereo pair of object 48 as described herein, Image 52 may be rectified (i.e., resized) using the software 20a, then both images may be rotated by "n" degrees and placed side-by-side for human viewing. For aerial photography where scenes are recorded on the Earth's surface ahead of the aircraft 12, "n" may be 90 degrees. It will be appreciated that when both images are captured from the same spatial position (as from a tower or stationary blimp), rotation has no effect because binocular disparity is not available (because both images are identical). The purpose of the rotation is to make non-horizontal disparity into horizontal disparity useable by the human visual system. An exception is if an object within the scene changes its angular orientation during the time interval between the image captures, then the object might be viewable in stereo if a suitable image rotation angle can be found—usually by a trial-and-error process specific for that one moving object.

Figure 6:
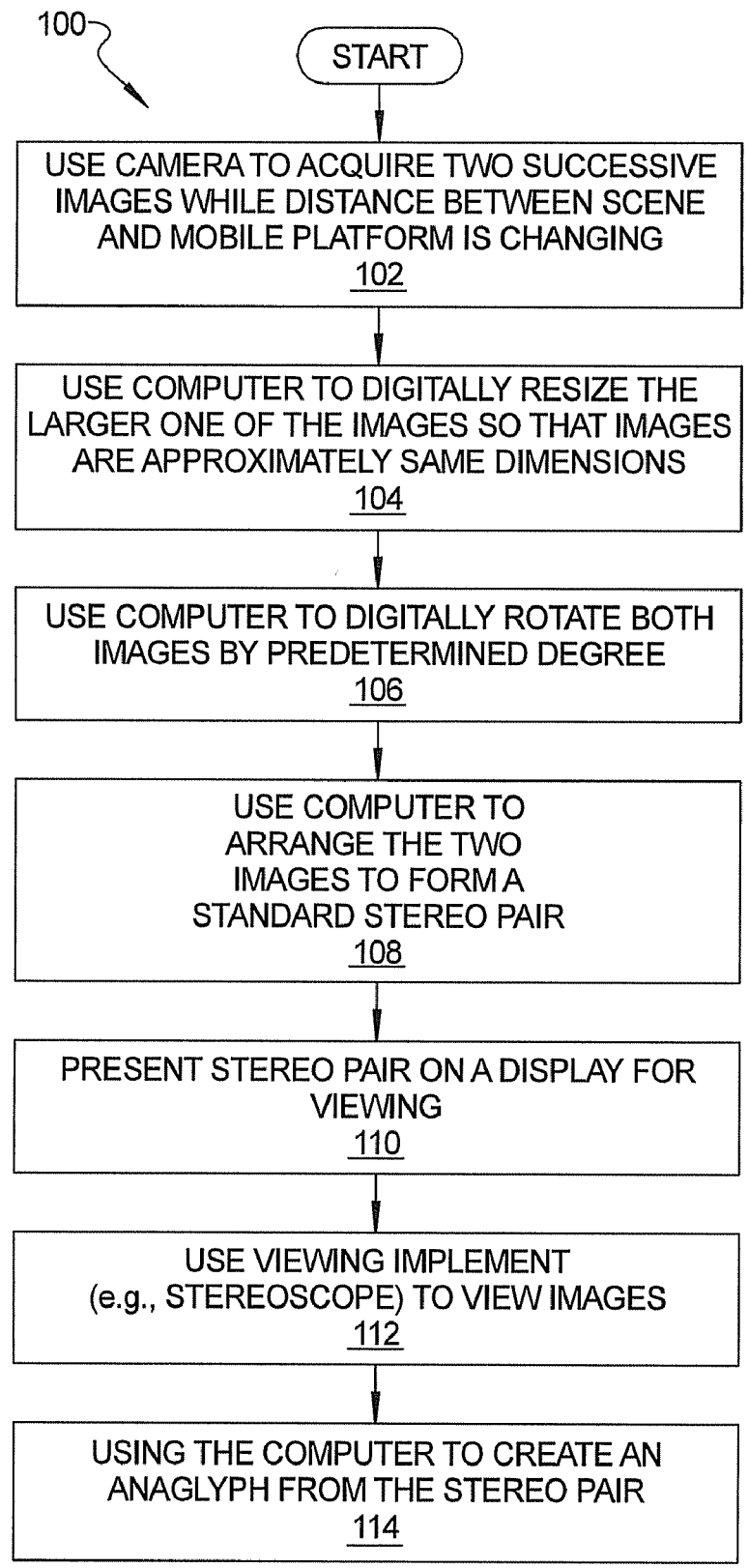
FIG. 6 is a flowchart setting forth various operations that may be performed in constructing a stereoscopic image in accordance with the teachings of the present disclosure.

Referring now to FIG. 6, a flowchart 100 is shown illustrating operations that may be carried out by the methodology of the present disclosure, for example using the system 10 shown in FIG. 1. Initially the camera 14 may be used to acquire two successive images of a scene generally near to the longitudinal axis 12a of the aircraft 12 while the relative distance between the aircraft and the scene or object is changing, as indicated at operation 102. At operation 104 the computer 20 may use the image editing software 20a to rectify (i.e., re-size) the larger one of the two images so that the two images are approximately equal in dimensions. At operation 106 the computer 20 may be used to digitally rotate both images by a predetermined degree, for example 90 degrees. At operation 108 the two rotated images may be arranged to form a stereo pair whose dimensions are compatible with the configuration of the stereoscopic viewer. At operation 110 the stereo pair may be presented on a suitable display for viewing. At operation 112 a viewing implement such as a stereoscope may be used to view the two images stereoscopically while they are presented on the display. At operation 114, which is an optional step, the stereo pair may be made into an anaglyph for viewing on the display using glasses having red and blue lenses instead of a stereoscope.

The system 10 and method described in the present disclosure may be used to form a complete automated measuring or visualization system for creating stereoscopic imagery from sequential monoscopic imagery acquired in near-axial directions (i.e., near the axis along which the camera is moved). The system 10 and method provides the further advantage that useful images can still be obtained even when a moving mobile platform (e.g., aircraft or ship) is pitching and/or rolling while obtaining images. With the previously developed imaging systems that rely on images taken with a camera looking perpendicular to the direction of travel of the platform, pitching and rolling motion of the platform often significantly affects the ability to capture the images being viewed. This limitation is not present, or at least significantly reduced, with the present system 10 and method.

The system 10 and method of the present disclosure may reduce the cost of obtaining stereoscopic imagery by reducing the maneuvering required by the sensor platform (i.e., the aircraft 12 or other form of mobile platform), and by using the maneuvers that the aircraft 12 is able to perform within the aircraft's flight constraints. Forward and backward-looking imaging sensors can acquire stereo imagery ahead of (or behind) the current ground track position without the need for an additional pass by the aircraft 12. Usage of fuel and time may thus be reduced. The aircraft's 12 exposure time to hazardous conditions may thus also be reduced. For a maneuvering sensor platform, the process makes available for stereoscopy some imagery that is otherwise not useable for stereo. For a stationary sensor platform, the process makes stereoscopy available using imagery of a target moving past the fixed sensor's position or rotating relative to the fixed sensor's position. Previously unavailable depth perception thus becomes available for the acquired images to help intelligence analysts to understand and interpret imaged scenes.

In a production or manufacturing application, the system 10 and method of the present disclosure can complement other inspection techniques inside complex manufactured objects (e.g., castings) where limited maneuvering space is available by enhancing the human operator's comprehension and understanding of the scene being imaged.

The system 10 and method can also be used to augment lab practices by establishing the capability to create stereo pairs of tiny moving objects (e.g., nano machines and living organisms) using images from a single fixed microscope having good depth-of-field. Still another application of the system 10 and method described herein may be in exploiting a third dimension in target signatures for automated target recognition in weapons and intelligence systems, to further improve a user's understanding and comprehension of an object or target being visualized. The methodology described herein may also assist with performance evaluations of automated target recognition algorithms in test environments.

The present system 10 and method further lends itself well to a wide variety of diverse potential applications, for example: intelligence gathering, battle damage assessment; potential entertainment applications involving gaming or film making; potential mapping applications, construction site profiling, contour measurements (e.g., by the NOAA, National Geodetic Survey, National Weather Service, etc.); engineering quality assurance, and specifically in connection with casting foundries, failure analysis; borescopes and borescope imaging accessories; space exploration; pipe inspections; forest fire fighting applications, storm damage assessment applications, emergency events such as accidents, mine disasters, natural disasters, etc.; health care applications, especially in connection with minimally invasive surgical techniques such as endoscopy; and homeland security applications involving the visual analysis of borders or specific geographic regions.

For a mapping application, the system 10 and method is useful where only one viewing direction is available along the line-of-travel. The axial stereoscopic imagery provided by the system 10 and method of the present disclosure can characterize land surfaces, cave interiors, fissures, cloud corridors, and boreholes. The process can also assist in the profiling of undersea structures and objects using images obtained from submersible vehicles. The benefits include convenience and more opportunities to use marginal vantage points.

In a space application the system 10 and method of the present disclosure can help optimize the interpretation of image data captured during flybys by creating stereo pairs using imagery obtained early during the approach and late after the pass. The benefit is that more mission imagery is made available for stereoscopic examination of the flyby's objective.

For applications involving forest fires, the system 10 and method of the present disclosure can be useful where visibility is restricted to corridors bounded by obscuring smoke plumes and maneuverability is restricted by air turbulence. In this instance, an aircraft using the system 10 can obtain stereo intelligence imagery axially along safe flight paths. The benefits are flight safety and availability of more opportunities to use marginal vantage points. The axial stereoscopy provided by the system 10 can also provide additional viewing directions of damage scenes in natural disasters, thus potentially reducing the number of passes by the platform and reducing cost.

In medical applications involving endoscopy, imagery from existing single-lens endoscope imaging equipment can be assembled into stereo pairs using the system 10 and method of the present disclosure for high-interest and unreachable targets. The benefit is the enhancement of the doctor's comprehension of the scene being examined, improving the basis for decision-making.

In a homeland security application, the system 10 and method of the present disclosure may help operators visually resolve objects using images from cameras on two separate towers when the objects are close to (but not on) the line connecting the two tower positions, and both towers are to one side of the target. Near real time displays may require automation of the system and process described herein. The benefit is that depth perception cues are available to image interpreters when sensor imagery quality is marginal.

For an entertainment application, an image sequence captured by a single sensor can be reconstituted to form stereo. This can provide a new way of viewing historical film footage, possibly even as stereoscopic motion pictures. For a mapping application where only one viewing direction is available along the line-of-travel, the axial stereoscopic imaging methodology described herein may characterize images of land surfaces, cave interiors, fissures, cloud corridors, and other items such that the items include a 3D quality, and thus become easier to interpret and understand.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for performing stereoscopic imaging comprising:
    obtaining a first image of a scene, at a first time, using a camera disposed on a mobile platform, where a first distance between the camera and the scene is changing as a result of movement of at least one of the camera or the scene being imaged, along an axis of movement;
    using the camera to obtain a second image of the scene, at a second time, where a second distance between the camera and the scene is different from the first distance, thus causing one of said first and second images to be larger than the other, and wherein the second image is taken along the axis of movement;
    resizing said one of said images so that the sizes of the two images are substantially similar; and
    rotating both of said images a predetermined degree so that said images form a stereo pair that may be viewed with a stereoscope viewing component or made into an anaglyph for viewing with an anaglyph viewing component.

2. The method of claim 1, wherein said obtaining first and second images using a camera disposed on a platform comprises obtaining first and second images using a camera mounted on a mobile platform, and where the axis of movement is the direction of travel of the mobile platform.

3. The method of claim 2, wherein said camera is aimed generally parallel to the direction of travel of said mobile platform, and wherein said camera is aimed forwardly relative to the direction of travel of said mobile platform; and
    wherein said mobile platform is moving toward said scene when said first and second images are acquired with said camera.

4. The method of claim 2, wherein said camera is aimed generally parallel to the direction of travel of said mobile platform, and aimed rearwardly relative to the direction of travel of said mobile platform; and wherein said mobile platform is moving away from said scene when said first and second images are acquired with said camera.

5. The method of claim 1, wherein said mobile platform is stationary and said scene is moving toward said mobile platform in a direction generally parallel to a direction in which said camera is aimed.

6. The method of claim 1, further comprising using a stereoscope to view said stereo pair.

7. The method of claim 1, wherein said resizing one of said images further comprises compressing said one of said images more along a first axis than along a second axis perpendicular to the first axis.

8. The method of claim 1, wherein said rotating said images comprises rotating both of said images by 0 to 90 degrees clockwise or counterclockwise from an orientation that said images were initially acquired in.

9. The method of claim 2, wherein said using a camera mounted on a mobile platform comprises using a camera mounted on an aircraft.

10. A method for performing stereoscopic imaging comprising:

obtaining a first image of a scene, at a first time, using a camera disposed on a mobile platform, and where the distance between the camera and the scene is changing while the mobile platform travels along an axis of movement;

using the camera to obtain a second image of the scene, at a second time, while the mobile platform remains travelling along said axis of movement, thus causing said first and second images to be obtained at different distances from said camera, and thus causing said second image to be larger than the first image;

resizing said one of said images so that the sizes of the two images are substantially similar; and rotating both of said images a predetermined degree so that said images form a stereo pair that may be either viewed with a stereo pair viewing component or made into an anaglyph for viewing with an anaglyph viewing component.

11. The method of claim 10, wherein said using the camera to obtain said first and second images comprises using the camera to obtain said first and second images while said mobile platform is travelling toward said scene.

12. The method of claim 10, wherein said using the camera to obtain said first and second images comprises using the camera to obtain the first and second images while the mobile platform is travelling away from the scene.

13. The method of claim 10, wherein said using the camera to obtain the first and second images comprises using the camera to obtain the first and second images while the mobile platform is stationary and the scene is moving toward the mobile platform.

14. The method of claim 10 wherein said rotating the first and second images comprises rotating said first and second images by 0 to 90 degrees clockwise or counterclockwise.

15. The method of claim 14, further comprising positioning said images adjacent one another such that said images form said stereo pair.

16. The method of claim 10, wherein said using a camera disposed on a mobile platform comprises using a camera disposed on an airborne mobile platform.

17. The method of claim 10, further comprising using a stereoscope to view said stereo pair.

18. The method of claim 10, wherein said using a camera to obtain said first and second images comprises using a digital camera to obtain first and second digital images.

19. The method of claim 18, wherein said resizing of said first and second digital images and said rotating of said first and second digital images comprises digitally resizing said first and second digital images and digitally rotating said first and second digital images.

20. A system for producing a stereoscopic image, comprising:

a camera mounted on a platform for obtaining a first and second images of a scene at two different points in time, said images further being obtained by said camera along the same axis of movement while a distance between said platform and said scene is changing, such that one of said images is larger than the other; and a processor adapted to analyze said images and to resize said one of said images such that both of said images are approximately the same size, and to rotate both of said images in a common rotational direction by a predetermined degree, to create a stereo pair that may be either viewed with a stereo pair viewing component or made into an anaglyph for viewing with an anaglyph viewing component.

* * * * *